United States Patent
Smith et al.

(10) Patent No.: US 9,084,397 B2
(45) Date of Patent: Jul. 21, 2015

(54) ENVIRONMENTAL CONDITONING SYSTEM FOR CUT FLOWERS AND OTHER FLORA

(71) Applicants: Fergus Stewartson Smith, S. Londonderry, VT (US); Dana Maerta Af Rosenborg Smith, New York, NY (US)

(72) Inventors: Fergus Stewartson Smith, S. Londonderry, VT (US); Dana Maerta Af Rosenborg Smith, New York, NY (US)

( * ) Notice: Subject to any disclaimer, the term of this patent is extended or adjusted under 35 U.S.C. 154(b) by 112 days.

(21) Appl. No.: 13/872,086

(22) Filed: Apr. 27, 2013

(65) Prior Publication Data
US 2014/0318008 A1    Oct. 30, 2014

(51) Int. Cl.
*A01G 5/00* (2006.01)
*A01B 79/00* (2006.01)
*A01G 5/06* (2006.01)

(52) U.S. Cl.
CPC .......................................... *A01G 5/06* (2013.01)

(58) Field of Classification Search
CPC ................................ A01G 5/00; B65D 85/505
USPC .................. 47/41.01, 41.1, 58.1 CF; 206/423
See application file for complete search history.

(56) References Cited

U.S. PATENT DOCUMENTS

| | | | |
|---|---|---|---|
| 3,986,337 A * | 10/1976 | Richard | ............................ 62/3.3 |
| 4,061,483 A | 12/1977 | Burg | |
| 4,681,611 A * | 7/1987 | Bohner | ............................ 62/3.64 |
| 5,341,595 A | 8/1994 | Griggs et al. | |
| 5,500,403 A | 3/1996 | Shafer et al. | |
| 6,365,548 B1 | 4/2002 | Ando et al. | |
| 6,440,900 B1 | 8/2002 | Koermer et al. | |
| 6,688,039 B2 | 2/2004 | Vonk et al. | |
| 7,199,082 B1 | 4/2007 | Chapman et al. | |
| 7,273,831 B1 | 9/2007 | Fleskes et al. | |
| 7,748,223 B2 * | 7/2010 | Minoura | ............................ 62/3.6 |
| 8,250,805 B2 | 8/2012 | Jaiswal | |
| 8,263,528 B2 | 9/2012 | Silva | |
| 2003/0159346 A1 | 8/2003 | Jung | |
| 2004/0140304 A1* | 7/2004 | Leyendecker | ................ 219/386 |
| 2005/0150162 A1 | 7/2005 | Usherovich | |

(Continued)

FOREIGN PATENT DOCUMENTS

| | | | | |
|---|---|---|---|---|
| JP | 01-153022 A | | 6/1989 | |
| JP | 04349824 A | * | 12/1992 | ............... A01G 7/00 |

(Continued)

OTHER PUBLICATIONS

International Search Report received in International Application No. PCT/US13165343 dated Mar. 21, 2014.

*Primary Examiner* — Andrea Valenti
(74) *Attorney, Agent, or Firm* — Mattingly & Malur, PC

(57) ABSTRACT

An environmental controlling system to better preserve cut flowers and other flora in vase water. The system uses thermoelectric modules, heat exchangers, fans, power supply, and a thermal conductor to cool and/or heat the water in a flower vase as required. By cooling the water, formation of algae and formation of a callus on the cut stem is reduced. In addition, keeping the stems in water of optimal temperature controls production of ethylene and other phytohormones. These effects prevent premature wilting, leaf abscission, flower senescence, and reduces the care required to maximize the life of cut flowers and other flora. In the event of cold ambient conditions that might cause freezing, the flow of heat can optionally be reversed, warming the water in the vase to avoid freezing the stems and/or maintain optimum temperature and other conditions for a specific variety of flora.

21 Claims, 5 Drawing Sheets

(56) References Cited

U.S. PATENT DOCUMENTS

| | | | |
|---|---|---|---|
| 2006/0005548 A1* | 1/2006 | Ruckstuhl | 62/3.2 |
| 2007/0113469 A1* | 5/2007 | Primozic | 47/41.01 |
| 2008/0029248 A1* | 2/2008 | Magnant | 165/104.19 |
| 2009/0151248 A1 | 6/2009 | Bissonnette et al. | |
| 2009/0211152 A1* | 8/2009 | Meeuws et al. | 47/41.01 |
| 2010/0000150 A1 | 1/2010 | Meeuws et al. | |
| 2010/0115834 A1 | 5/2010 | Miyahara | |
| 2010/0139160 A1 | 6/2010 | Hirsh et al. | |
| 2010/0186423 A1* | 7/2010 | Veltrop et al. | 62/3.6 |
| 2013/0111811 A1 | 5/2013 | Miyauchi et al. | |

FOREIGN PATENT DOCUMENTS

| | | |
|---|---|---|
| JP | 07-264934 A | 10/1995 |
| JP | 2000-305632 A | 11/2000 |
| KR | 20010011537 A | 2/2001 |

\* cited by examiner

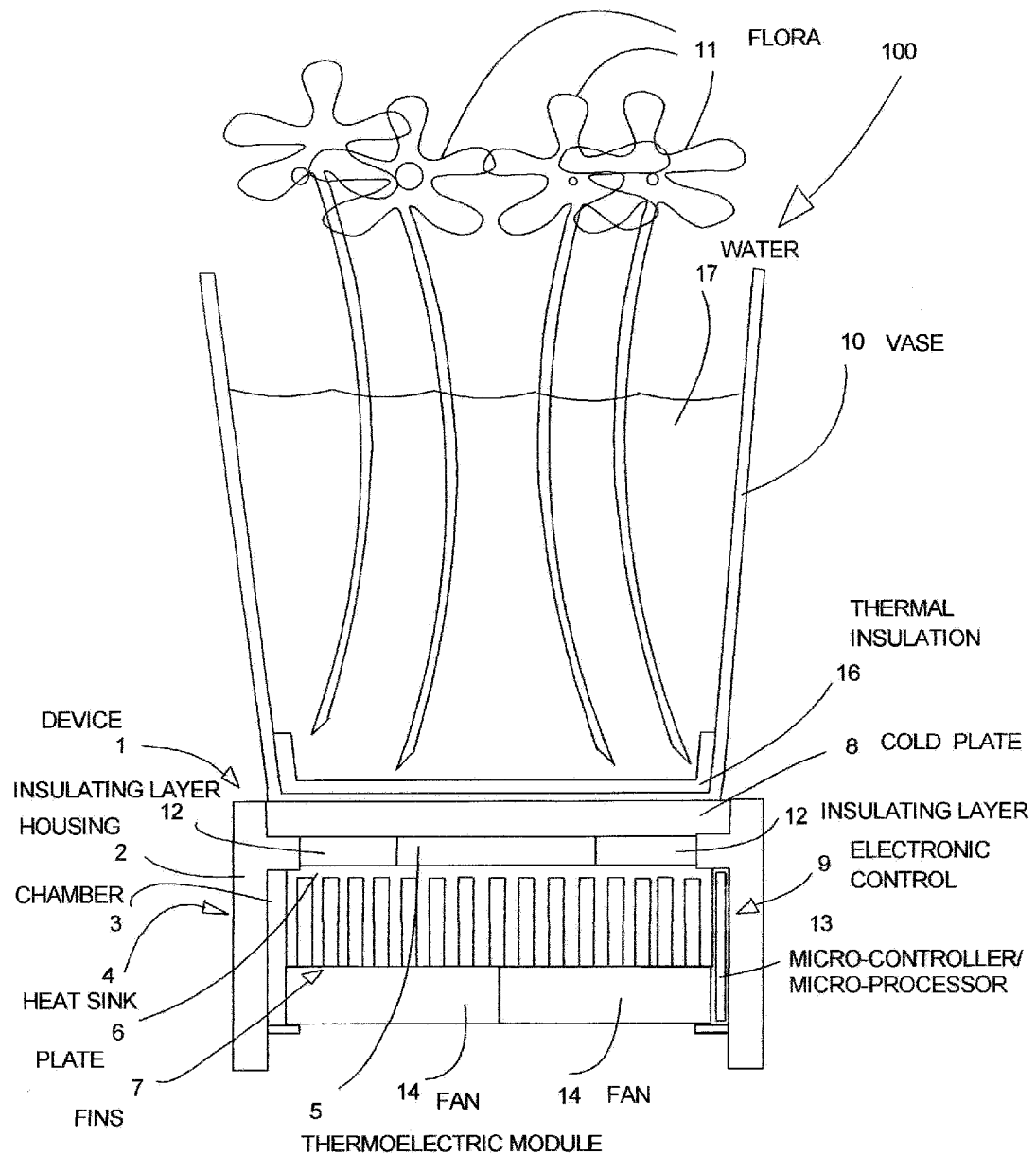

ENVIRONMENTAL CONDITONING SYSTEM FOR CUT FLOWERS AND OTHER FLORA

CROSS REFERENCES TO RELATED APPLICATIONS

This is the regular utility filing of provisional patent application 61/687,972, filed May 4, 2012, titled "Vase Environmental Conditioning Device" by the same inventors.

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

1. Field of the Invention

The present invention relates generally to methods and apparatus for preserving plants after cutting, and, in particular, relates to preserving cut flowers and flora in a container, and, in greater particularity, relates to cooling and/or heating the water in a vase or other container that is used to hold cut flowers and other flora.

2. Description of the Prior Art

Cut flowers such as roses and other flora are frequently used to enhance the aesthetics and health of an environment and as a gift of endearment and appreciation. The lifetime of such often expensive cut flora is limited by the ability of the cut stem to draw water up to the petals, leaves, etc., by the growth of algae that can plug the transport cells in the xylem and the growth of a callus by the flora itself that seals off the cut end of the stem in an undesired attempt to heal itself.

In addition the phloem needs to be free to transport liquid down through the stem for the proper functioning of the cells in the flora.

In order to deal with the effects of algae and growth of a callus, it is standard practice to change the water in a vase every second day and recut the end of the stem to remove the callus and algae. Unfortunately, this procedure is time consuming, and many people either do not know of this procedure or forget to do it or are unaware of how best to extend the life of cut flora. In addition, each time the stem is cut the flora becomes shorter reducing its aesthetic value.

The importance of control of phytohormones should not be underestimated. For example, roses are popular as cut flowers partly as they are dicots, dicots being generally less affected by auxins than monocots. But all flora are not equally affected such as lilies, being monocots, are generally even more deleteriously affected by auxins than roses, thus the conventional practice of preservation has not been commercially practical.

Flower shops typically keep flowers in a cooler, cooling the entire flower to prolong their life, but once sold to the consumer, the flower immediately starts to deteriorate.

Other products currently exist that are sold to enhance the lifetime of cut flora. Some products are marketed as "plant food" or "plant preservatives". One such "plant food" is actually the chemical, alum (aluminum magnesium sulfate). Alum acidifies the water in the vase in an attempt to retard the growth of algae. Unfortunately this approach has limited value and in some cases is deleterious to the flora. Other products use algaecides or metal ions that are toxic to algae in an attempt to limit or retard algae growth. Here again these products are often undesirable, perform poorly, and can actually damage the flora.

Several patents disclose different chemical compositions and processes to preserve cut flows: U.S. Pat. Nos. 8,263,528; 8,250,805; 7,273,831; 7,199,082; 6,688,039; 6,440,900; 6,365,548; 5,500,403; and 4,061,483. These patents are incorporated by reference.

Accordingly, there is a need for a device and method for preserving cut flowers and flora and other plants without the use of chemicals.

SUMMARY OF THE INVENTION

The present invention provides a device for extending the useful life of cut plants, and in particular, cut flowers and flora by the use of a temperature controlling device.

The temperature controlling device has one or more thermoelectric modules or cooling/heating devices attached to one or more heat sinks and cold plates. When the correct power is applied to a thermoelectric module or cooling/heating device, heat flows from the "cold" side of the thermoelectric module or cooling device to the "hot" side of the module where heat sinks are located. In the case of the thermoelectric device, this is called the Peltier Effect. The hot side of the module is placed in thermal contact with a heat sink. The heat sink absorbs and distributes the heat into itself, and typically through its fins to exchange the heat to the ambient air. To enhance that transfer of heat to the ambient air, a fan can be used to circulate the air maximizing heat transfer. Use of a fan can reduce the size of the heat sink required and minimize reheating of the vase by preventing the warmed air from coming into contact with the vase.

The cold side of the thermoelectric module is placed in contact with a thermally conductive cold plate. This plate is brought into thermal contact with the vase in a manner that facilitates transfer of heat from/to the water in the vase.

Since the cold plate is in thermal contact with the cold side of the thermoelectric module this heat from the water of the vase is transferred to the heat sink and in turn to the ambient air.

The vase can be placed on the cold plate directly if the vase is composed of a good thermal conductor such as a metal. If the vase is composed of a poor thermal conductor such as glass, ceramic, or plastic, it is desirable then to enhance the thermal conduction of heat from the water to the cold plate by adding a thermal conductor. The thermal conductor can extend from near the surface of the water in the vase to the cold plate underneath the vase. If the vase is sitting on the cold plate the thermal conductor can extend through a hole in the bottom of the vase and have a large enough diameter where it contacts the cold plate to efficiently transfer heat from the water in the vase into the cold plate and vice versa.

Alternatively, if desired, a modified thermal conductor can be placed in thermal contact with the upper section of the water in the vase. The advantage to this approach is that a thermal conductor may not be required extending through the center of the vase as the cold water produced by the device will cause convection directly. If the vase is built of a thermally conductive material such as metal the device can be brought into thermal contact virtually anywhere in or on the vase.

If the vase is composed of a transparent material such as glass or plastic it can generally be more aesthetically desirable to place the cold plate under the vase and use a thermal conductor that extends up through the center of the vase to near the surface of the water to cause efficient transfer of heat from the water in the vase by conduction and convection, cooling or heating the water from the inside out, minimizing thermal load.

In addition, it can be desirable to use a vase composed of a poor thermal conductor, such as glass, ceramic, or plastic to minimize the heat gain from the ambient air. If the surface of the vase is closer to the ambient temperature due to the poor thermal conductivity of the walls of the vase, less heat will flow into the water putting less burden on the cooling device allowing the device to be smaller, consume less energy, and will cause less condensation on the exterior of the vase. In this case the thermal conductor is required if the cooling device is located underneath the vase. If the thermal contact is made by placing the temperature controlling device at, in, or near the top surface of the water in the vase an additional thermal conductor may not be required.

As an alternative, the water in the vase can be circulated out of the vase through the cold plate attached to the thermoelectric device or other heat/cool device and back to the vase. This is generally less desirable aesthetically and functionally, but can be desirable for use in larger vases as the larger apparatus required can be remotely located out of sight. It also can facilitate larger cooling devices such as conventional gas compression or absorption cooling devices as well as provide a means to add water to the vase as needed.

As another alternative, the cold plate can be liquid cooled or heated and the heat transferred to or from the cold plate by circulating the liquid to a remote heat exchanger or cooling device.

It is therefore one aspect of the present invention to provide an attractive, compact device based on a thermoelectric cooler or other cool/heat device so that the aesthetic aspects of cut flowers can be maintained and the useful life of such flora can be maximized.

It is another aspect of the present invention to provide a temperature control device for a vase having no maintenance beyond the periodic addition of water to replenish the water lost to transpiration by the flora and evaporation. In fact the evaporation of water is reduced by the lowering of the temperature of the water in the vase by the temperature control device.

It is another aspect of the present invention to provide a method of extending the useful life of cut plants, and flowers in particular that does not use any chemicals in the water and/or preservatives.

It is another aspect of the present invention to provide a method and a temperature cooling device that eliminates or greatly reduces algae growth and the growth of a callus on the cut end of a stem.

It is a further aspect of the present invention to provide a device that adjusts the voltage and power applied to the thermoelectric module to maintain the temperature of the water in the vase at an optimal performance level.

In another aspect of the present invention wherein the temperature controlling device adjusts the voltage and power applied to a fan or fans to control the amount of heat transferred and thus the temperature of the water in the vase is maintained at an optimum operating temperature.

In another aspect of the present invention, the flow of heat is reversed in order to heat the water to avoid freezing and damaging the stems of the flowers by reversing the polarity of voltage applied to the module.

In another aspect of the present invention, the temperature controlling device will make monocots commercially practical as cut flowers, greatly expanding the aesthetic possibilities.

In another aspect of the present invention, an LED indicator is used to verify the proper functioning and/or temperature of the device.

In another aspect of the present invention, a thermal switch or switches can be used to control the temperature controlling device having the thermoelectric device therein and/or the fan to obtain the desired water temperature in the vase.

In another aspect of the present invention, a micro-controller is used to sense the temperature of the device and/or the vase water with a thermistor, thermocouple, or other temperature sensing device in order to control the cooling or heating applied to the vase water in conjunction with the thermoelectric module and/or fan. In addition, the micro-controller can verify proper operation of the device and indicate the condition by illuminating one or more LEDs.

These and other objects, features, and advantages of the present invention will become more readily apparent from the attached drawings and the detailed description of the preferred embodiments, which follow.

BRIEF DESCRIPTION OF THE DRAWINGS

FIG. 2 is a side elevation cross-section of the temperature controlling device with a metallic vase and insulated cup inside the bottom of the vase;

Like reference numerals refer to like parts throughout the several views of the drawings.

DETAILED DESCRIPTION OF THE PREFERRED EMBODIMENTS

The present invention provides a device for extending the useful life of cut plants, and in particular, cut flowers and flora by the use of a temperature controlling device that appropriately adjusts the water temperature.

Even the standard practice cited above does not extend the life of many flora as compared to the present invention. In addition to controlling algae and callus growth, cooling the stems in the water reduces the production and transport of ethylene, auxins, and other phytohormones, as well as accumulation of such phytohormones in the vase water. Ethylene is a plant hormone that accelerates ripening and deterioration of many plants and fruit. Ethylene is generally recognized as causing deterioration of flowers if they do not receive adequate air ventilation. By preventing generation and accumulation of ethylene in the vase water, deterioration of flowers is delayed. The effect of reduction of auxins can also be observed as cooling the stems stimulates new growth of shoots on the stems and retards callus formation where the stem has been cut. The reason for the preference for new growth of shoots at the expense of callus or root formation is the reduced ratio of auxin to cytokinin.

Figure 1:
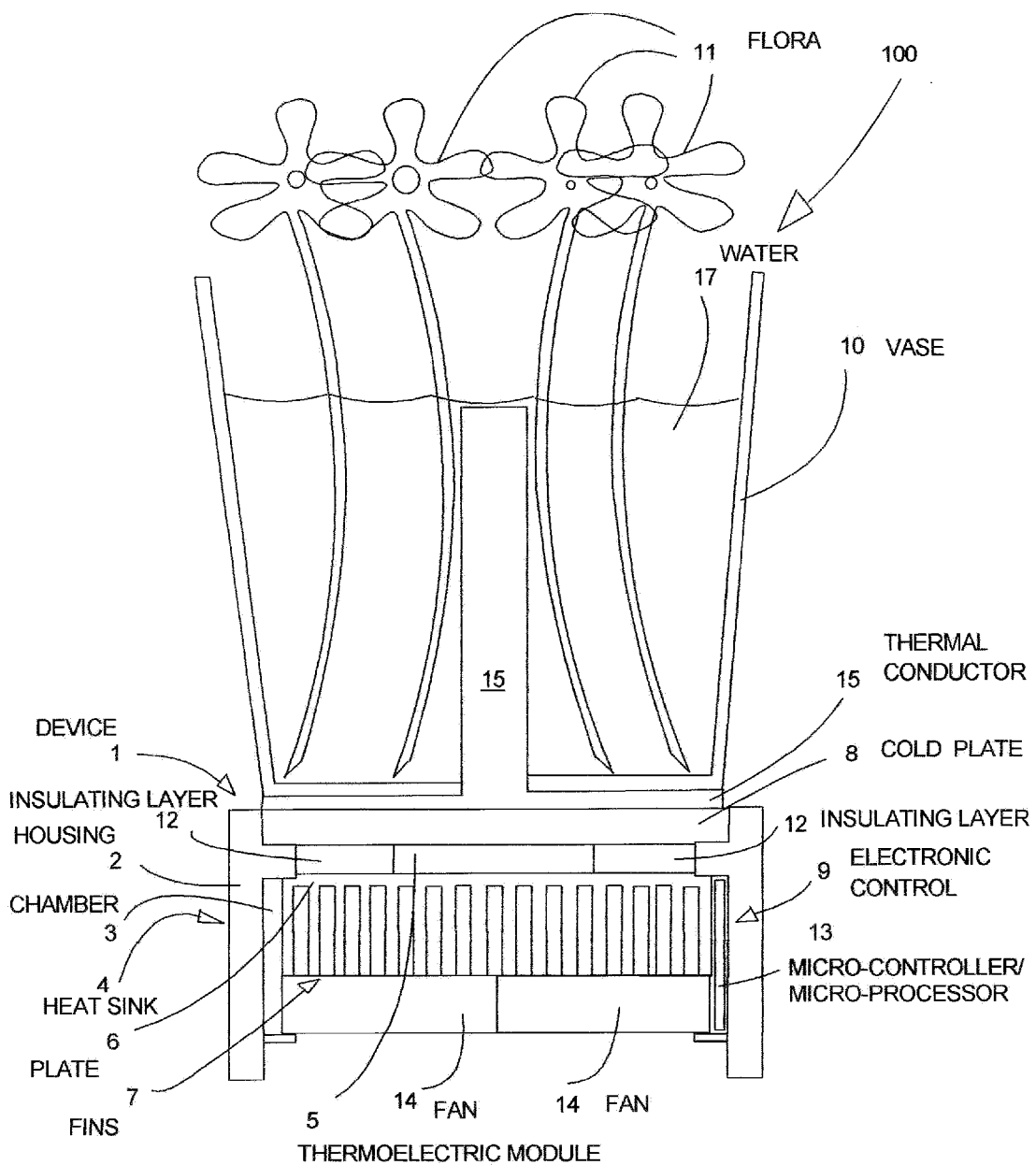
FIG. 1 is a side elevation cross-section of the temperature controlling device with a glass vase and thermal conductor within the vase.

Referring now to FIG. 1, a temperature controlling system 100 has a vase cooling device 1 with a housing 2 that defines an open chamber 3 in which a heat sink 4 and a thermoelectric module 5 is disposed. The thermoelectric module operates as a Peltier device. The overall dimensions of housing 2 may vary greatly not only in terms of size but also shape and may be ornamental in nature. A number of configurations are suitable for heat sink 4. The configuration shown for heat sink 4 is composed of a metal plate 6 having multiple fins 7. In general, multiple fins 7 fixed in the conventional manner optimize heat transfer from the thermoelectric module 5 in the preferred embodiment, but other heat dissipation means or configurations may be suitable.

The hot side of the thermoelectric module 5 is typically in thermal contact with heat sink 4 and a cold side of thermoelectric module 5 is typically in thermal contact with a cold plate 8. Cold plate 8 is in contact with the vase 10 or other container. By reversing the polarity of the power applied to the thermoelectric module 5 with an electronic controller 9, the direction of heat flow effected by thermoelectric module 5 can be reversed to warm the vase 10 and avoid freezing of the cut stems of flora 11 in the event the vase becomes too cold as in the occurrence of cold weather.

Heat sink 4 and cold plate 8 are typically formed of metal that is an excellent heat conductor. Most preferred are copper or aluminum or the like. The surface ratio of heat sink 4 to cold plate 8, the thermal characteristics of the materials used to form heat sink 4 and cold plate 8, the characteristics of thermoelectric module 5, as well as the air velocity and flow over heat sink 4 are such that the cold plate 8 is maintained at an appropriate temperature so as to maintain the desired temperature of the water in vase 10, typically about a few degrees above zero degrees C. Typically the thermal resistance between heat sink 4 and cold plate 8 will be well below 2 degrees Celsius per Watt. Cold plate 8 will typically have a surface area of 0.5 to 50 square inches or more. It will be appreciated that heat sink 4 and cold plate 8 will be attached to thermoelectric module 5 in the standard way known to those skilled in the art.

A fan or fans 14 are shown below heat sink 4 to circulate ambient air through heat sink 4 to increase the cooling efficiency of heat sink 4. Appropriate vents in the housing 2 would be included as necessary. The fan or fans 14 can be configured in a number of ways known in the art. The configuration shown is preferred for the purpose of compactness and high efficiency. The use of two fans 14 allows placement of the fans such that the highest velocity air at the periphery of each fan 14 is introduced directly under the center of cold plate 8, and in turn, directly under the center of thermal conductor 15. This minimizes the thermal path. In addition, locating the fans 14 directly at the bottom of heat sink 4 and fins 7 improves heat transfer efficiency by inducing vortices into the spaces between fins 7 due to rotation of the blades in fans 14 and aerodynamic shear directly over fins 7. This reduces the thickness of the boundary layer of air that typically insulates the surface of fins 7 of heat sink 4.

Cold plate 8, housing 2, heat sink 4, and insulating layer 12 may contain one or more small holes or paths to allow condensed water from vase 10, cold plate 8, and thermoelectric module 5 to flow into the area of heat sink fins 7 in order to increase the cooling effect obtained and dispose of the condensate.

Thermoelectric module 5 is surrounded by insulation layer 12 to seal out moisture and minimize undesired heat flow between heat sink 4 and cold plate 8.

In some applications requiring a large heat transfer area and/or high thermal capacity, it may be desirable to utilize more than one thermoelectric module per heat sink and/or cold plate, as well as multiple heat sinks and/or cold plates. When multiple thermoelectric modules are utilized, it is often useful to wire the modules in series.

A micro-controller 13 is preferably provided for careful regulation of the temperature of vase 10 as well as controlling and monitoring of proper functions as noted herein and performance of the device. Micro-controller 13 using appropriate sensors can track temperatures, humidities, dew points, moisture, light levels, other atmospheric conditions, electrical conditions, perform diagnostics, vary operation by time of day, control LED lights and lighting, communicate with other electronic devices, and log the operation of the device. As to operational condition of the system, a thermochromic or other visible temperature indicator utilizing liquid crystals, leuco dyes, or other means indicates by a change in color, transparency, or other means that the system is operating properly. For example, microencapsulated dyes can be embedded, printed, laminated, etc., in or on the vase, housing, or cold plate, the color, transparency, or other appearance of which would indicate the operating temperature of the water in the vase or the system. The color, for example, may change continuously over a predetermined range.

In conjunction with the real time clock, the micro-controller 13 can control the operation of the device 1 as to time of day, by the calendar day, and by the season as well as in conjunction with natural light and artificial illumination requirements.

The vase can be placed on the cold plate 8 directly if the vase is composed of a good thermal conductor such as a metal. If the vase is composed of a poor thermal conductor such as glass, ceramic, or plastic, it is desirable to enhance the thermal conduction of heat from the water to the cold plate of device 1. A typical configuration of a thermal conductor is shown in FIG. 1. The thermal conductor 15 can have a base disk which is positioned on the upper surface of the cold plate and can include an elongated portion which is configured to extend from near the surface of the water, upper horizontal line therein, in the vase 10 to the base disk portion of the thermal conductor 15 which is positioned on top of the cold plate 8 and underneath the vase 10. If the vase 10 is sitting on the base disk portion of the thermal conductor 15 that is, in turn, positioned on the cold plate 8, the elongated portion of the thermal conductor 15 can extend through a hole in the bottom of the vase. The thermal conductor 15 can have a large enough diameter base disk, where it contacts the cold plate directly, to efficiently transfer heat from the water in the vase into the cold plate and vice versa. This embodiment is useful when the vase is made of a material that poorly conducts heat such as glass.

Alternatively, if desired, the device 1 can be placed in thermal contact with the upper section of the water in the vase. The advantage to this approach is that a thermal conductor may not be required extending through the center of the vase as the cold water produced by the device will cause convection directly. If the vase is built of a thermally conductive material such as metal the device can be brought into thermal contact virtually anywhere in or on the vase.

If the vase is composed of a transparent material such as glass or plastic it can generally be more aesthetically desirable to place the cold plate under the vase and use a thermal conductor 15 that extends up through the center of the vase to near the surface of the water to cause efficient transfer of heat from the water in the vase by conduction and convection, cooling or heating the water from the inside out, minimizing thermal load.

In addition, it can be desirable to use a vase composed of a poor thermal conductor, such as glass, ceramic, or plastic to minimize the heat gain from the ambient air. If the surface of the vase is closer to the ambient temperature due to the poor thermal conductivity of the walls of the vase, less heat will flow into the water putting less burden on the cooling device allowing the device to be smaller, consume less energy, and will cause less condensation on the exterior of the vase. In this case the thermal conductor is required if the cooling device is located underneath the vase. If the thermal contact is made by placing the cooling device at, in, or near the top surface of the water in the vase an additional thermal conductor may not be required.

As an alternative, the water in the vase can be circulated out of the vase by tubes through the cold plate attached to the thermoelectric device or other heat/cool device and back to the vase. This is generally less desirable aesthetically and functionally, but can be desirable for use in larger vases as the larger apparatus required can be remotely located out of sight. It also can facilitate larger cooling devices such as conventional gas compression or absorption cooling devices.

As another alternative, the cold plate can be liquid cooled or heated and the heat transferred to or from the cold plate by circulating the liquid to a remote heat exchanger or cooling device.

The temperature controlling system 100, FIGS. 1 and 2, is provided for plants such as cut flowers that cools and/or heats water in at least one container such as a vase.

Figure 3A:
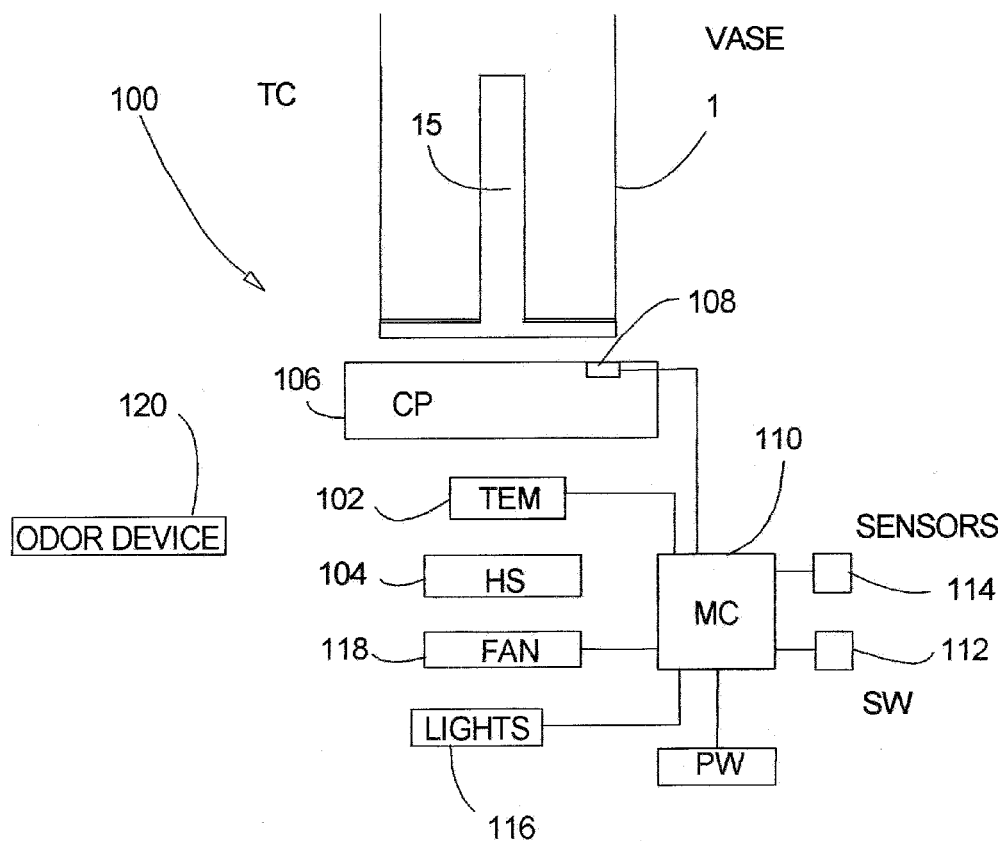
FIG. 3A is a block diagram of a preferred embodiment of the present invention.

FIG. 3A illustrates one embodiment of the present invention. A temperature controlling system 100 includes at least one thermoelectric module 102 therein. The thermoelectric module 102 may be replaced by any device that can remove heat from a surface such as cooling coils. In order to remove the heat, at least one heat sink 104 or heat exchanger may be used. In order to provide a more efficient heat transfer between the vase 1 and the module 102, a cold plate 106 is placed there between. A temperature sensor 108 on or near the cold plate 106 may also be employed to monitor the temperature of the vase 1 by the micro-controller 110. If the temperature of the vase 1 falls below a given value, the current can be reversed in the thermoelectric device 102 by the micro-controller 110 to heat the water in the vase 1. The temperature controlling system 100 also may include a thermal conductor 15 to facilitate transfer of heat from/to the water in the container and to minimize a temperature differential in the water in the vase. The temperature controlling system 100 is controlled by a micro-controller 110 having one or more microprocessors therein being of conventional design and programmed to operate the system 100. A touch switch 112 may be used to turn the system on. The temperature controlling system 100 may include current and voltage sensing devices 114 to measure the temperature of the module and relating this to the ambient temperature and the temperature of the water. Further one or more LEDs in the light indicator 116 can be used to indicate the operating condition of the system. To remove heat from the thermoelectric module 102, at least one fan 118 cools the heat sink 104 and increases air flow in and around the system, 100. The fan speed is also monitored and adjusted by the micro-controller 110. If needed one insulating layer 16, FIG. 2, may be used inside the vase at the bottom to prevent excessive cooling and inadvertent freezing of the ends of the flower stems where they rest at the bottom of said vase. Clearly a plastic spacer can be used to prevent over cooling of the stem ends. Many sensors may be employed in the system 100 such as at least one humidity, moisture, or dew point sensor to detect the conditions when water may condense on the device and/or the container; at least one photosensor to detect ambient light levels; at least one illumination device to provide lighting to the flowers in the vase for photosynthesis, bio-regulation, and aesthetic purposes that can be scheduled and controlled by the micro-controller/processor; and at least one water level sensor to detect the need to add water to the vase and to further communicate this information. The water level sensor or device may be a thermochromic dye, ink, strip, film, or other temperature indicator that can be applied or attached on or in the vase as the water is colder or warmer where the water contacts the surrounding material such as the surface of the vase.

The temperature controlling system 100 may also include at least one communication port, power line carrier such as HomePlug, WIFI connection to the Internet, RF link such as Bluetooth, or light communication such as an IR port so as to be able to communicate with the temperature controlling system.

The temperature controlling system 100 may also include with the micro-controller 110 at least one real time clock for controlling the time of day and calendar operation of the device with the micro-controller. Also included in another embodiment would be at least one auxiliary output control such as a relay to control other devices such as a water dispensing system, additional lighting, ventilation, and the like. Also included in system 100 may be at least one speaker or sound producing device to alert a user to the condition of the system and/or the container, such as a low water condition or temperature out of intended range.

Another feature of the present invention is an odor enhancing or freshening device/means 120, FIG. 3A, in the form of a card, strip, or other form that is inserted into or adjacent to the air flow through or from the heat sink or other heat exchanger. Many hybrid roses and other flora have lost their natural aroma due to selective breeding; by enhancing the aroma of the flora, the user can enjoy a more complete aesthetic experience.

Figure 4:
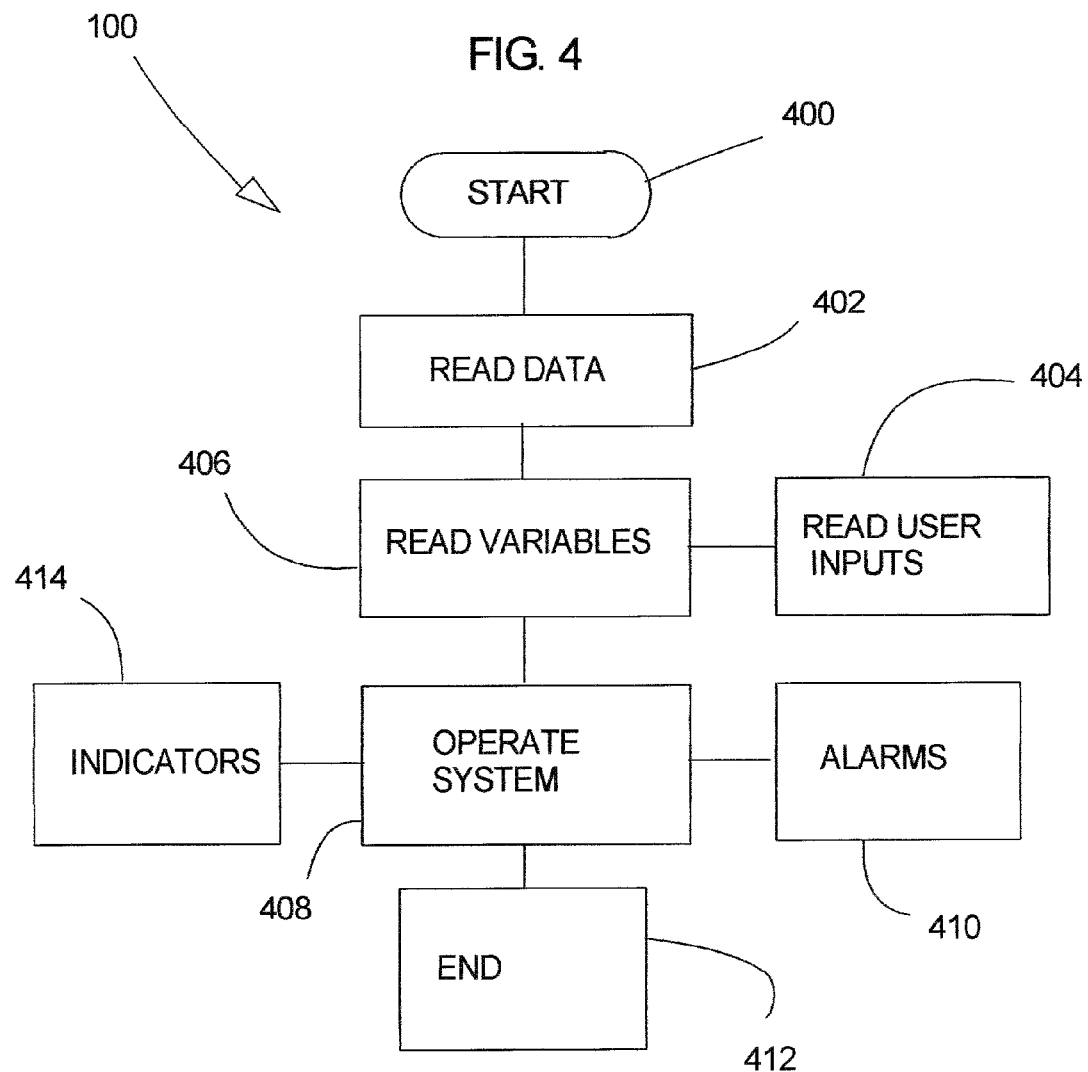
FIG. 4 is a block flow diagram of the present invention having a programmable processor therein.

FIG. 4 illustrates a possible flow diagram for a microprocessor used in a microcontroller of the present invention. The system 100 is started 400 by a switch. Upon turn on, the microprocessor will request user inputs 404 as applicable data is read 402. These user inputs 404 may not be requested if the user has already input them from a prior turn on. The user inputs would include such items as date, time, flora, operating times, etc. Next, the system 100 would read applicable variables 406 through sensors, etc., such as present ambient temperature, light, water temperature, etc. After reading the data and variable, the system 100 would operate the system 100 and adjust various indicators 414 such as operating condition. If the conditions are not within specification, the microprocessor would output alarms 410, visibly, by sounds, verbally, or otherwise. The system 100 would be terminated or end 412 operations if by user inputs or out of limit conditions.

Figure 3B:
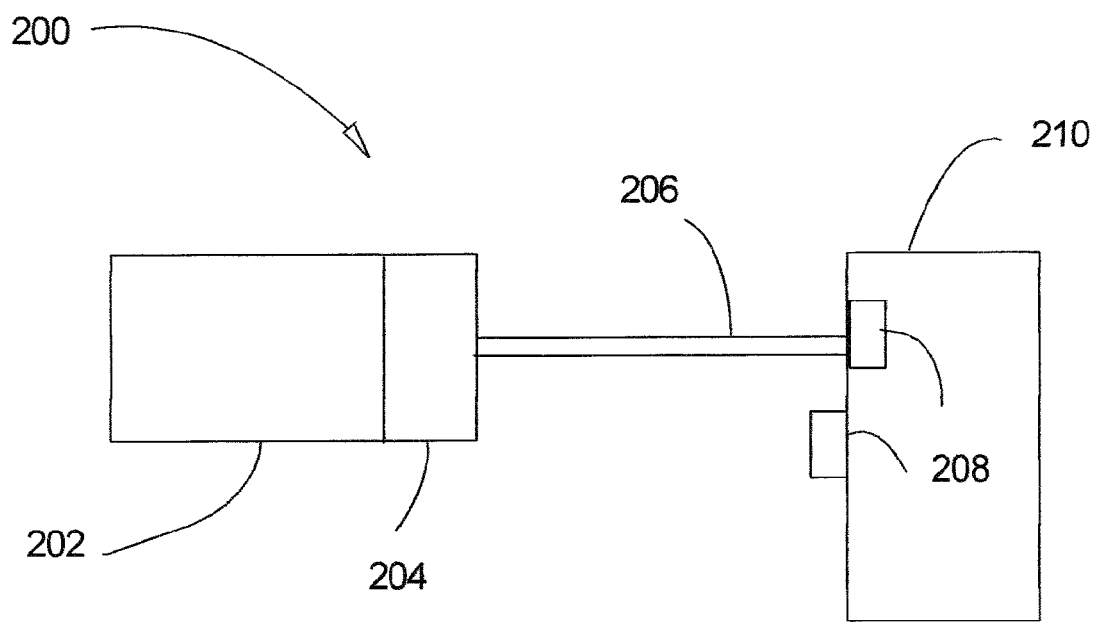
FIG. 3B illustrates a generic temperature controlling system.

FIG. 3B illustrates a generic temperature controlling system 200 that includes a cooling/heating device 202. The device 202 may employ a water circulator 204 with a heat exchanger therein. Water is circulated through lines 206 into a heat exchanger 208 located inside the vase or outside of a container 210 such as in the base. The circulating water is separate for the water in the container 210. As noted above, appropriate controls, sensors, power, etc., would operate the cooling/heating device 202. In the preferred embodiment above, no water circulation is required since heating/cooling of the water is accomplished by means of the thermoelectric module, the cold plate, and the vase walls, and if there is not sufficient heat conduction, a temperature conductor may be added to the vase as noted above depending on the material of the vase walls.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A temperature control system for plants comprising:
a temperature control device contained within a housing and including at least one thermoelectric module having a first, cold module surface and a second, hot module surface;
a cold plate positioned in a top opening of the housing, said cold plate having a first cold plate surface in heat exchange contact with said first, cold module surface of said at least one thermoelectric module, and an exposed second, generally planar, cold plate surface;
a heat sink having a first heat sink surface in heat exchange contact with said second, hot module surface of said at least one thermoelectric module and a second heat sink surface configured as a heat dissipation surface;
at least one fan for directing a flow of air across said heat dissipation surface of said heat sink;
a plant container adapted to receive plants and to provide temperature control to said plants, said plant container having a base and walls and containing a volume of water, with the walls of the plant container being in direct contact with said volume of water; and,
a thermal conductor having a base portion positionable above the housing and directly on said exposed, second, generally planar, cold plate surface, and having an elongated rod portion which is perpendicular with a center of the thermal conductor base portion, said elongated rod portion extending upwardly into said plant container through an opening in the base of said plant container, said elongated rod portion of said thermal conductor being placed into direct physical and heat exchange contact with said water in said plant container, said elongated rod portion of said thermal conductor being removed from said plant container when said thermal conductor is separated from said plant container, said thermal conductor base portion being substantially the same size as said base of said plant container.

2. The temperature control system as recited in claim 1, further comprising an insulating layer, said insulating layer positioned about said at least one thermoelectric module.

3. The temperature control system as recited in claim 1, further comprising a microprocessor to control the operation of said temperature control system.

4. The temperature control system as recited in claim 1, further comprising at least one temperature sensor associated with said at least one thermoelectric module to control the temperature of said at least one thermoelectric module and said water in said plant container.

5. The temperature control system as recited in claim 1, further including a current and voltage sensor for measuring the temperature of the thermoelectric module and to relate this temperature of the thermoelectric module to the ambient temperature and to the temperature of the water.

6. The temperature control system as recited in claim 1, further comprising at least one LED (light emitting diode) to indicate an operating condition of the system.

7. The temperature control system as recited in claim 1, wherein the plant container is a vase and wherein said plants are cut flowers having stems received in the water in said vase whereby said thermal conductor cools the water in said vase and the stems of the cut flowers to reduce the production of phytohormones.

8. The temperature control system as recited in claim 1, wherein two fans are positioned beneath the heat sink to increase air flow around the heat sink, said two fans being positioned in relation to the thermoelectric module to maximize the removal of heat from the heat dissipation surface by placing the two fans such that high velocity ends of blades of each of the two fans are disposed at a location of the heat dissipation surface which underlies a center of the thermal conductor.

9. The temperature control system as recited in claim 1, further comprising at least one electronic voltage controller to vary a speed of the at least one fan.

10. The temperature control system as recited in claim 1, further comprising at least one electronic voltage controller to vary one of a voltage and a current applied to the thermoelectric module to one of heat and cool water in said plant container.

11. The temperature control system as recited in claim 1, further comprising at least one insulating layer inside a bottom of said plant container.

12. The temperature control system as recited in claim 1, further comprising at least one of a humidity, moisture, and dew point sensor.

13. The temperature control system as recited in claim 1, further comprising at least one photosensor to detect ambient light levels.

14. The temperature control system as recited in claim 1, further comprising at least one illumination device to provide light to a plant in the plant container for photosynthesis, bio-regulation, and aesthetic purposes and which can be scheduled and controlled by one of a micro-controller and a processor.

15. The temperature control system as recited in claim 1, further comprising at least one communication port, power line carrier, connection to the Internet, RF (radio frequency) link, light communication and occupancy sensor to be able to communicate with the temperature control system.

16. The temperature control system as recited in claim 1, further comprising at least one real time clock to control time of day and calendar operation of the temperature control device.

17. The temperature control system as recited in claim 1, further comprising at least one auxiliary output control to control including at least one of a water dispensing system, lighting, ventilation, an occupancy sensor, and environmental conditioning units to coordinate their functions with respect to said temperature control system.

18. The temperature control system as recited in claim 1, further comprising at least one water level sensor to detect a need to add water to the plant container and to further communicate this information.

19. The temperature control system as recited in claim 1, further comprising at least one of a speaker and a sound producing device to alert a user to the condition of at least one of the system and the container.

20. The temperature control system as recited in claim 1, further comprising a visible temperature indicating device to indicate the operational condition of said temperature control system.

21. The temperature control system as recited in claim 1, further comprising an odor control device.

* * * * *